H. FELDMEIER AND C. B. DALZELL.
COMBINED CHURN AND BUTTER WORKER.
APPLICATION FILED JAN. 20, 1922.
1,419,033.
Patented June 6, 1922.
4 SHEETS—SHEET 2.
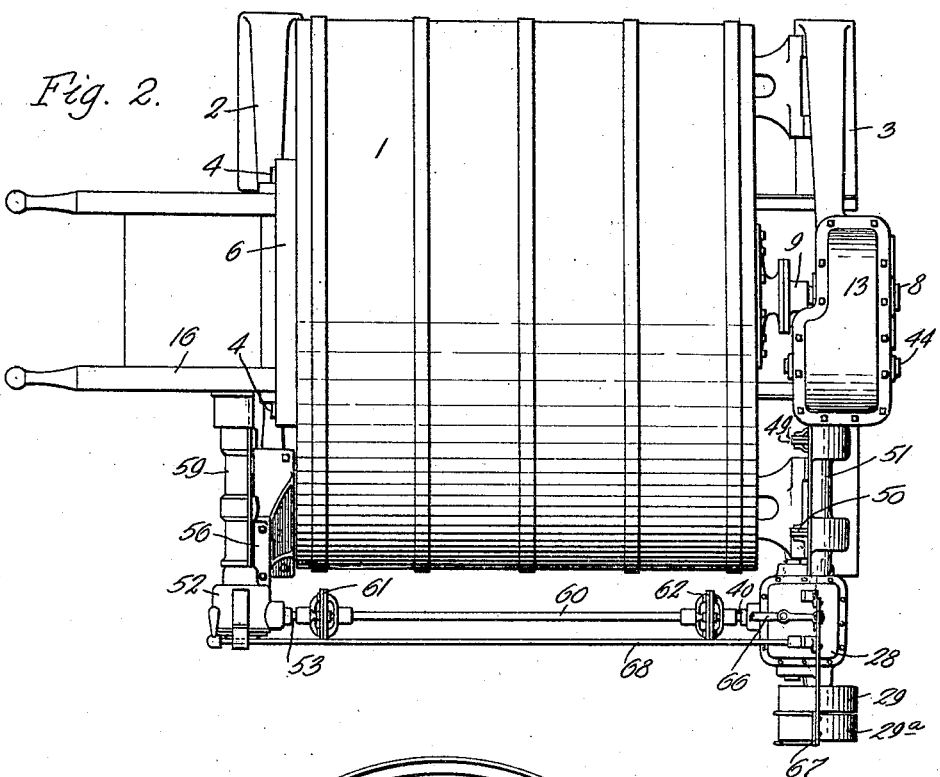
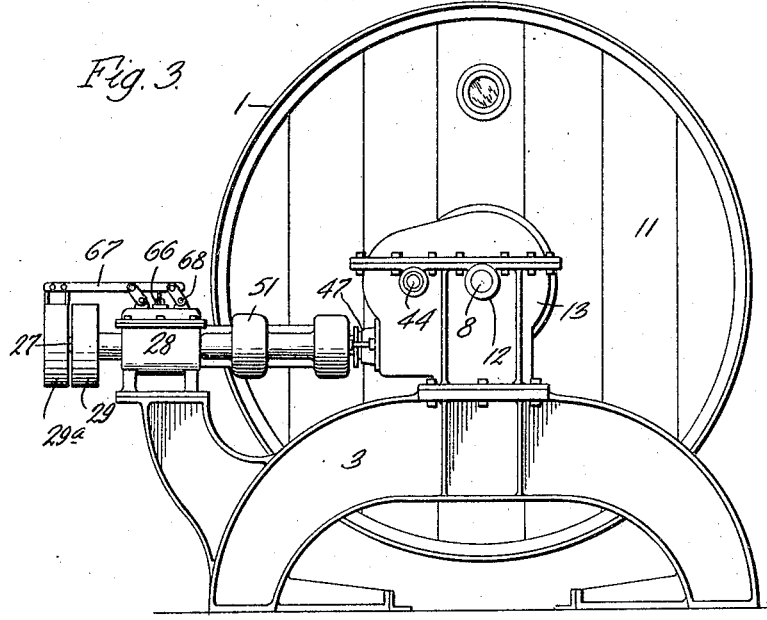
INVENTORS
Harvey Feldmeier
and Charles B. Dalzell,
by Parker & Prochnow.
ATTORNEYS.

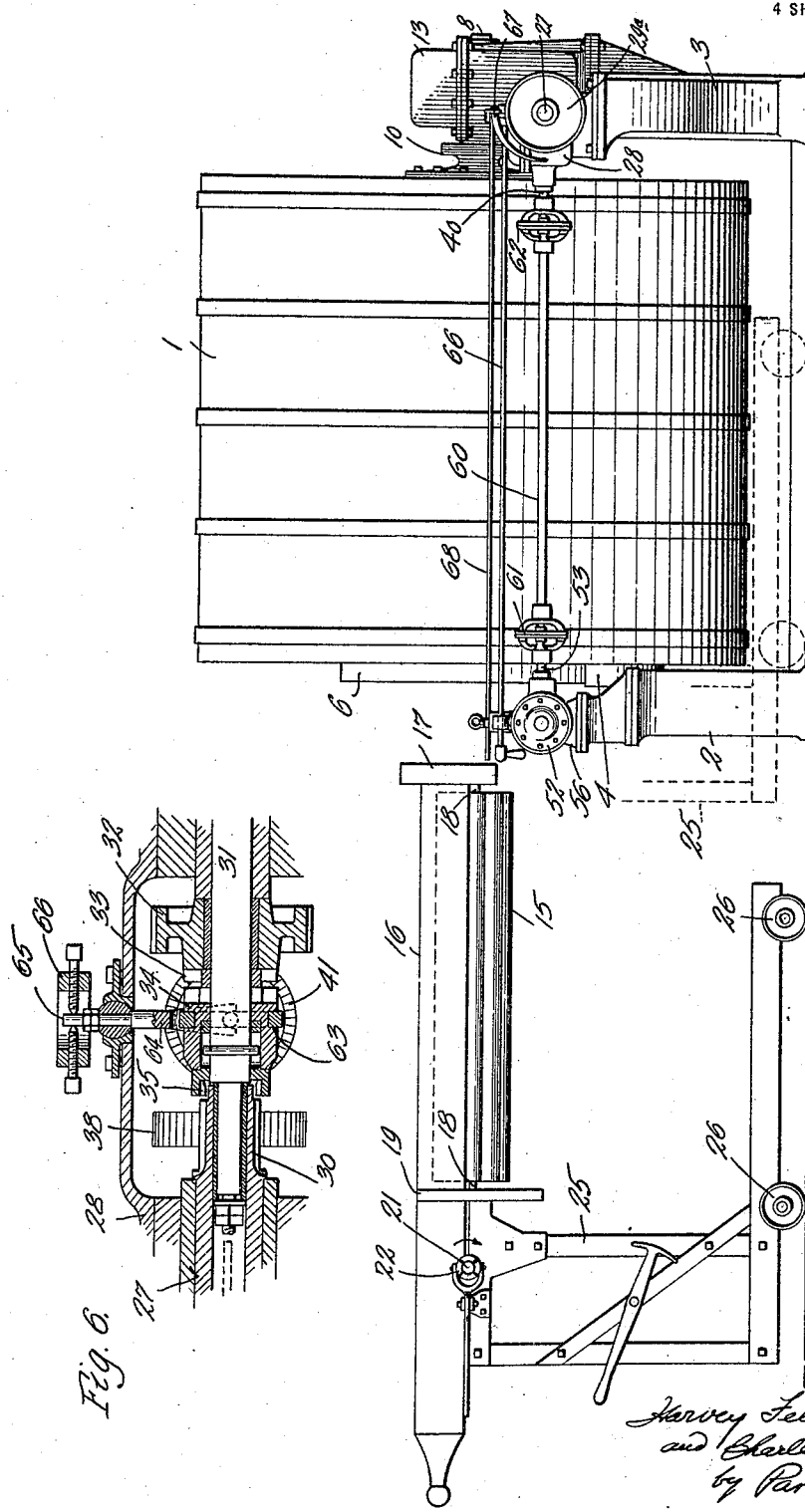

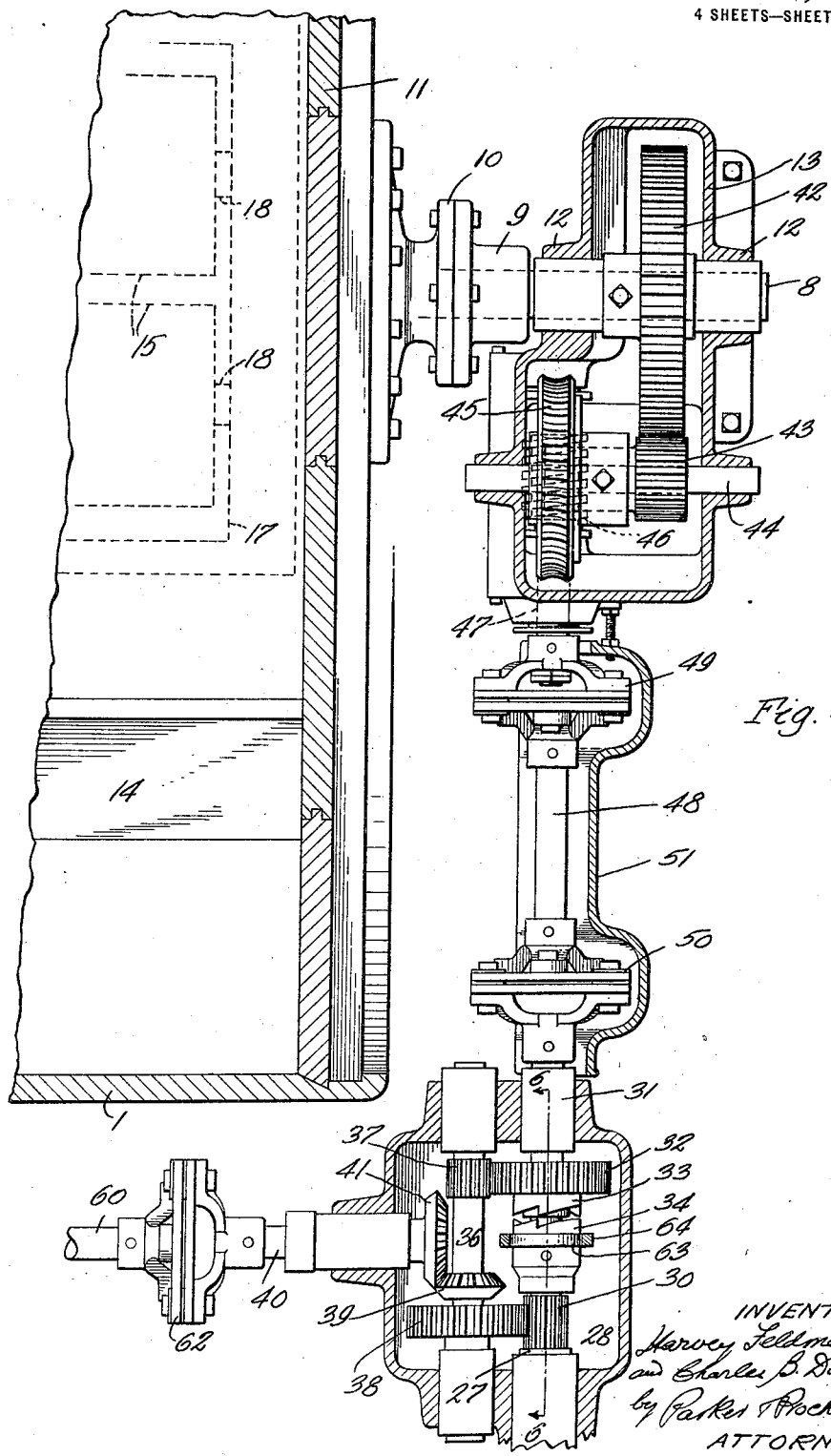

UNITED STATES PATENT OFFICE.

HARVEY FELDMEIER AND CHARLES B. DALZELL, OF LITTLE FALLS, NEW YORK, ASSIGNORS TO D. H. BURRELL & CO., INC., OF LITTLE FALLS, NEW YORK.

COMBINED CHURN AND BUTTERWORKER.

1,419,033.   Specification of Letters Patent.   Patented June 6, 1922.

Application filed January 20, 1922. Serial No. 530,654.

*To all whom it may concern:*

Be it known that we, HARVEY FELDMEIER and CHARLES B. DALZELL, citizens of the United States, residing at Little Falls, in the county of Herkimer and State of New York, have invented a new and useful Improvement in Combined Churns and Butterworkers, of which the following is a specification.

Our invention relates to improvements in combined churns and butter workers and particularly to that type of machine wherein butter working rolls are independently mounted to be insertable in and removable from the churn so that the churn may be operated without the worker during the churning operation and after this operation has been completed the churn and working rolls operated together to work the butter.

One of the objects of our invention is to provide an improved means for driving the churn and the butter worker which insures the proper operation of the churn irrespective of inaccuracies in the mounting or alignment of the churn.

Another object of our invention is to provide a driving mechanism, the operating parts of which may be completely housed and operate in a suitable lubricant to insure silent operation, long life and low cost of maintenance.

Other objects and advantages of our invention will more fully appear in the accompanying specification and claims.

For the purpose of illustrating our invention we have shown, in the accompanying drawings, a combined churn and butter worker embodying our invention. In said drawings:

Fig. 1 is a side elevation of a combined churn and butter worker embodying our invention, showing the butter worker withdrawn.

Fig. 2 is a plan view thereof showing the butter worker inserted in the churn.

Fig. 3 is a rear elevation of the apparatus.

Figure 5:
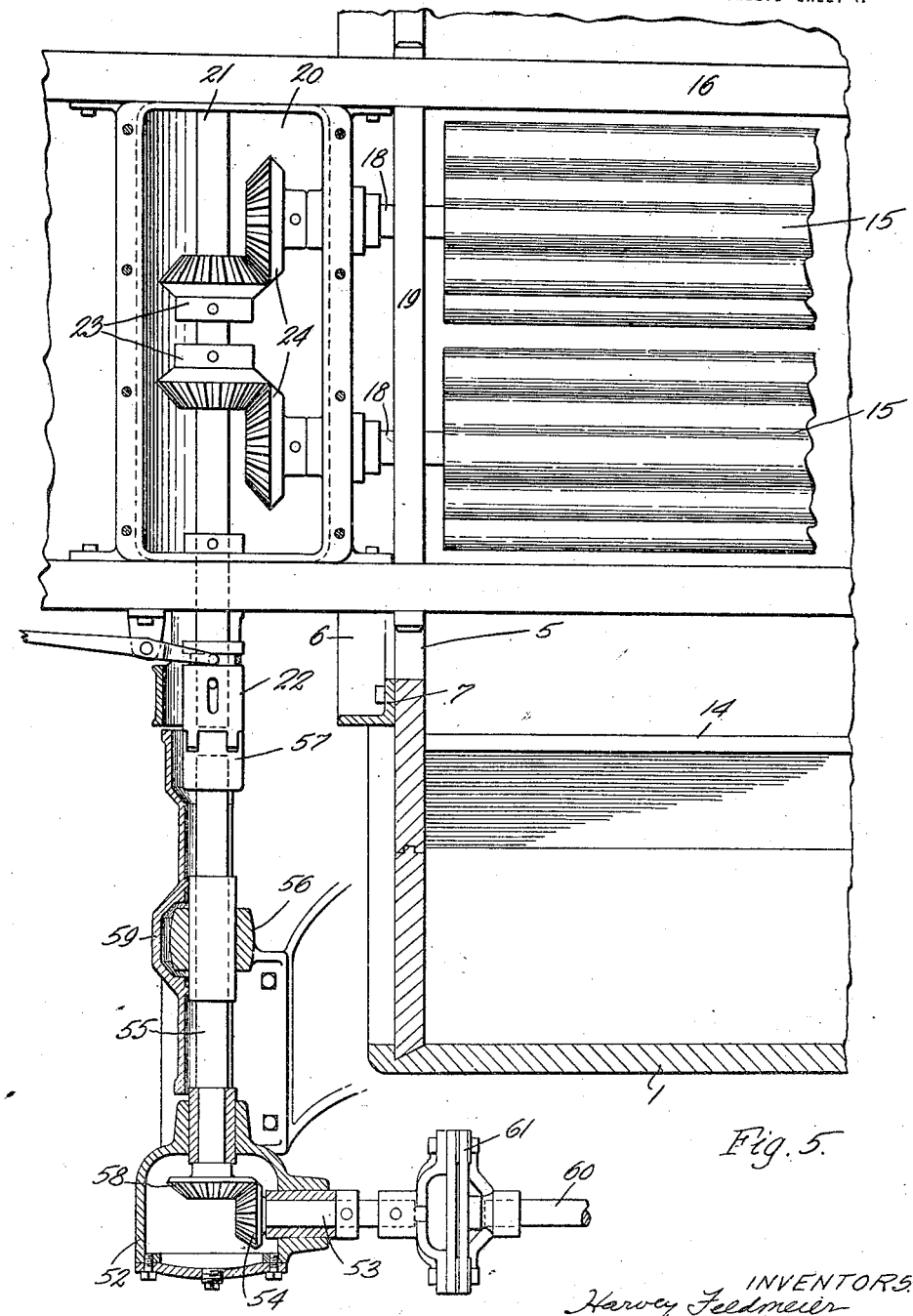

Figs 4 and 5 taken together show an enlarged detailed plan of the machine, parts of the housing of the driving mechanism being sectioned to illustrate the interior of the driving mechanism and part of the churn being sectioned to show the location of the working rolls, and Fig. 6 is a detail section on the line 6—6 of Fig. 4.

In the embodiment illustrated the churn comprises a rotary drum 1 horizontally disposed and supported on a rigid frame. This frame comprises the front casting 2 forming a pair of front legs and a rear casting 3 forming a pair of rear legs, the two castings being suitably connected. Mounted on the front casting of the frame is a pair of rollers 4 suitably spaced apart. Surrounding the enlarged opening 5 in the front end of the drum is a ring 6 having a flange 7 by which it is bolted in position on the head of the drum, which ring rests upon the two rollers 4 whereby the front end of the drum is rotatably supported and at the same time the opening 5 is unobstructed. The rear end of the drum is provided with a stub shaft 8 having rigidly secured thereon a flanged collar 9, the flange of which is bolted to a flange 10 formed on a casting, in turn bolted to the rear head 11 of the drum 1. The shaft 8 is supported in a pair of bearings 12 formed in the lower section of a gear housing 13, which housing is bolted or otherwise secured to the rear end member 3 of the frame. By the above mounting the drum is horizontally supported in position and in the operation of churning, the cream is inserted through the opening 5 in the front end and after the opening is closed the churn is rotated, tumbling the cream about on the interior of the drum and causing the cream to strike against suitable churning paddles 14 until the butter is formed.

After the butter has been formed it is properly worked between a pair of corrugated rolls 15 mounted in a suitable frame 16. This frame, at its rear end, is provided with a cross bar 17 in which the rear ends of the shafts 18 of the rollers are journalled and, intermediate of its ends, the frame is provided with a second cross bar 19. The shafts 18 project through the cross bar 19 and into a gear casing 20 which is supported by the two side members of the frame 16 and are journalled in one side of said casing. Extending transversely through this gear case and journalled therein is a drive shaft 21, one end of which projects beyond the side of the frame and is provided with a suitable clutch member 22. Within the housing 20 a pair of bevelled gears 23 is mounted on the drive shaft 21 and these gears 23 mesh with a pair of bevelled gears 24 mounted on the ends of the shafts 18 and within the gear casing, to provide a means for driving the working rolls. The frame 16 is suitably supported upon a carriage 25, having rollers 26 whereby the carriage may be moved back and forth. The working rolls 15, after the butter has been churned, are adapted to be inserted within the churn and as the butter is carried upward by the paddles 14 in the churn it will be dropped down upon the corrugated rolls and worked therethrough, thereby working the butter to the proper consistency and eliminating the milk and water from the butter as well as providing means for working through the butter the proper amount of salt which may be added from time to time.

The driving mechanism for the drum and rolls is so arranged that a single power device is used for operating both the drum and the rolls, provision being made for disconnecting the rolls from the driving mechanism to permit their removal from the drum, and this driving mechanism is so arranged relatively to the drum that the various gear parts thereof may be housed and operate in baths of oil to reduce the friction and consequent noise to the minimum, and to insure a noiseless and frictionless operation of the parts irrespective of distortions of the frame or inaccuracies in the mounting of the drum. This driving mechanism is also so disposed that a speed changing transmission gear may be used for transmitting the power to the various parts, permitting a change of speed in the operation of the drum and providing a single driving connection with the power mechanism for both the working rolls and the drum. To this end the speed changing mechanism as a unit is mounted on the stationary frame of the drum and includes a power shaft 27, having a bearing in the lower portion of the gear casing 28 which in turn is rigidly bolted in position on a suitable shelf on the rear casting 3 of the frame. This power shaft is provided with a tight belt pulley 29 keyed or otherwise secured on the power shaft and a loose belt pulley or idler 29$^a$ loosely mounted on the shaft. The inner end of this shaft projects into the gear casing 28 and is provided with a pinion 30 keyed thereon. A second shaft 31 is journalled in the gear casing 28 and has its inner end extending into the gear casing, being provided with a gear 32 loosely mounted thereon and provided with one member 33 of a clutch. The other member 34 of the clutch is keyed on the shaft 31 to slide endwise thereon and is provided at one end with teeth for engagement with the teeth of the clutch member 33 and at its opposite end with gear teeth 35 arranged to be meshed with the teeth of the pinion 30 by sliding the clutch member 34 to the left whereby the shaft 31 may be directly connected by the teeth 35 of the clutch 34 with the shaft 27. A countershaft 36 is journalled in the gear casing 28 and within this casing the shaft is provided with a pinion 37 keyed thereon and with a drive gear 38 likewise keyed thereon as well as a bevelled gear 39. The drive gear 38 meshes with the pinion 30 on the power shaft thereby driving the countershaft 36 and with it the bevelled gear 39 and the pinion 37. When the clutch member 34 is in engagement with the clutch member 33, the shaft 31, it will be seen, is connected with the power shaft 27 through the gears 32, 37, 38 and 30. A second drive shaft 40 extending substantially at right angles to the drive shaft 31 is likewise journalled in the gear case and at its inner end, and within the casing, is provided with a bevelled gear 41 meshing with the bevelled gear 39 so that the shaft 40 will be operated from the power shaft 27 through the pinion 30, the gear 38 and the beveled gears 39 and 41.

The stub shaft 8 secured to the rear head of the drum has keyed or otherwise rigidly connected thereon a gear 42 operating in the housing 13 which gear meshes with a pinion 43 mounted on a countershaft 44 journalled in the housing 13, and this countershaft 44 is provided with a worm gear 45 which in turn meshes with a worm 46 (see Fig. 4) mounted in the housing and on a shaft 47 likewise mounted in the housing 13. The shaft 47 of the driving gear for the rotary drum and the shaft 31 of the speed changing transmission gear are connected by means of a shaft 48 connected at its opposite ends with the two shafts above mentioned by universal couplings 49 and 50 to provide a flexible connection between the speed changing transmission gear and the driving gear of the drum which connection permits variations in alignment and distortion of the frame as well as inaccuracies in the mounting of the drum to occur without affecting the operation of the drum and without imposing any additional strain or causing increased friction on the driving mechanism or the drum. In order that the connecting shaft 48 and the universal couplings 49 and 50 may be properly housed to prevent accidental contact therewith, there is provided an enclosing housing 51 which is secured at its opposite ends in any suitable manner to the housings 13 and 28 which are likewise suitably supported from the framework.

Mounted at the front end of the drum and on the front portion 2 of the frame is a gear housing 52 which has journalled therein a shaft 53 extending in a direction parallel with the axis of the drum and having on its end and within the housing a bevelled gear 54. A second shaft 55 extends into the housing 52 at right angles to the shaft 53 and projects in a direction parallel with the front head of the drum, being journalled in the housing and also in a support 56 on the frame and having at its end a clutch member 57 adapted to cooperate with the clutch member 22 of the working rolls. The two shafts 53 and 55, on their ends and within the housing 52, are provided respectively with the bevelled gears 54 and 58 whereby the shaft 55 is driven from the shaft 53, and to prevent the workmen from coming into dangerous contact with the shaft 55 and its associated parts a suitable housing 59 partially surrounds this shaft and its associated parts. The shaft 53 and shaft 40 of the transmission unit are connected together by an intermediate shaft 60, suitable universal couplings 61 and 62 being interposed between the shaft 60 and the shafts 40 and 53 to permit differences in alignment of the shafts and provide a flexible connection.

For operating the clutch member 34 of the transmission unit this member is provided with an annular groove 63 in which engages a ring connected to a clutch shifting yoke 64 provided with a suitable stud 65 which extends through the top of the transmission gear housing and is connected with an operating lever 66 extending to the front end of the machine. A belt shifter 67 is likewise provided for shifting the belt, by which the machine is adapted to be driven, back and forth from the idler to the drive pulley, this shifter being mounted on the top of the transmission gear housing and operated by means of a rod 68 extending to the front of the machine.

In operating the drum it is desirable, during the churning operation, to rotate the drum more rapidly than during the butter working operation, therefore during the churning operation the clutch member 34 is moved to cause the teeth 35 thereof to engage with the teeth of the pinion 30, thereby directly connecting the worm drive unit of the drum with the power shaft 27. After the cream has been churned and the butter working rolls are placed in position and connected by means of the clutch members 22 and 57 with the roll drive shafts of the drive mechanism, it is desirable to operate the drum at a slower rate of speed to give the butter, which is raised on the paddles as the drum rotates, a chance to drop down on to the working rolls. Therefore, the clutch member 34 is shifted out of engagement with the pinion 30 and the two members 33 and 34 engaged so that the drive for the drum will be from the power shaft through pinion 30, the gear 38, the pinion 37 and the gear 32, thereby materially reducing the speed at which the drum is rotated. It will be noted that the shaft 40 is continually driven from the power shaft 27 through the pinion 30, the gear 38 and the two bevelled gears 39 and 41 which permits the continued operation of the butter working rolls, after they have been inserted in position in the drum, irrespective of whether the drum is rotated or not. This is advantageous under certain circumstances, such, for instance, as where a large batch of butter has been churned and it is desired after considerable butter has dropped on to the rolls to permit this butter to work through the rolls before additional butter is dropped thereon. By disengaging the clutch members 33 and 34 and throwing the clutch into neutral the drum may be stopped without stopping the operation of the rolls.

Having thus described our invention, what we claim as new and desire to secure by Letters Patent is:

1. In a combined churn and butter worker, the combination with a rotary drum, a stationary supporting frame therefor, and butter working rolls mounted on an independent carriage and insertable in an open end of said drum, of a driving mechanism for said drum and rolls comprising a gear drive for said drum, a speed changing transmission gear mounted on said frame connected with said rolls and having a flexible connection with said drum gear drive, and a drive for said rolls detachably connected with said rolls and having a flexible connection with said speed changing transmission gear.

2. In a combined churn and butter worker, the combination with a rotary drum, a stationary supporting frame therefor, and butter working rolls mounted on an independent carriage and insertable in an open end of said drum of a driving mechanism for said drum and rolls, comprising a drive gear for said drum having a flexible shaft, a flexible shaft drive for said rolls, a power drive, and a speed changing transmission gear operated by said power drive and connected to both of said flexible shafts.

3. In a combined churn and butter worker, the combination with a rotary drum, a stationary supporting frame therefor, and butter working rolls mounted on an independent carriage and insertable in an open end of said drum, of a gear drive mounted on said frame and connected to the closed end of said drum, a speed changing transmission gear mounted on said frame, a flexible shaft connecting said transmission gear to said gear drive and a second flexible shaft detachably connected with said rolls and driven from said transmission gear.

4. In a combined churn and butter worker, the combination with a rotary drum, a stationary supporting frame therefor, and butter working rolls mounted on an independent carriage and insertable in an open end of said drum, the closed end of said drum having a supporting shaft journalled on said frame, of a gear drive connected to said shaft, a speed changing transmission gear mounted on said frame, a flexible drive shaft extending from said transmission gear to said gear drive, a clutch for connecting said shaft with a speed changing gear to permit the drum to remain stationary or operate at high or low speed, and a second flexible shaft detachably connected with said rolls and driven from said transmission gear.

5. In a combined churn and butter worker, the combination with a rotary drum, a stationary supporting frame therefor, and butter working rolls mounted on an independent carriage and insertable in an open end of said frame, of a driving mechanism for said drum and rolls comprising a drive gear for said drum, a flexible shaft extending transversely at the closed end of said drum, a flexible shaft extending longitudinally at one side of the drum and detachably connected with the rolls, and a speed changing transmission gear mounted on said frame at the angle formed by said shafts and operably connected with both of said shafts.

6. In a combined churn and butter worker, the combination with a rotary drum, a stationary supporting frame therefor, and butter working rolls mounted on an independent carriage and insertable in an open end of said drum, of a driving mechanism for said drum and rolls comprising a speed changing transmission gear mounted on the drum frame at one end and to one side of said drum and connected with the driving power, a drum driving gear, a flexible connecting shaft extending transversely at one end of the drum between said drum drive gear and transmission gear, a roll driving mechanism extending transversely at the opposite end of the drum and having a detachable connection with the rolls, and a flexible driving shaft extending longitudinally at one side of the drum and connected with the roll driving mechanism and with the speed changing transmission gear.

7. In a churn, the combination with a rotary drum, and a stationary supporting frame therefor, of a shaft secured to one end of said drum and rotatably mounted on said frame, a gear housing into which said shaft extends, a worm drive for said shaft enclosed within said housing, a speed changing transmission gear stationarily mounted on said frame, and a flexible shaft extending between said transmission gear and said worm drive gear.

8. In a combined churn and butter worker, the combination with a rotary drum, a stationary supporting frame therefor, and butter working rolls mounted on an independent carriage and insertable in an open end of said drum, of a transmission gear mounted on said drum frame, means for driving said drum from said transmission gear, a flexible shaft extending along one side of said drum and operated from said transmission gear, and means for detachably connecting said flexible shaft with the working rolls.

9. In a combined churn and butter worker, the combination with a rotary drum, a stationary supporting frame therefor, and butter working rolls mounted on an independent carriage and insertable in an open end of said drum, of a transmission gear stationarily mounted on said frame, a power shaft for operating said gear, a flexible connection extending between said transmission gear and the drum for operating the drum and a second flexible connection extending between said transmission gear and the rolls and detachably connected with the rolls.

10. In a churn, the combination with a rotary drum having an opening in its front end, and a stationary frame of roller supports on said frame for the front end of said drum to provide a rotary mounting for said drum while leaving the front unobstructed, a driving shaft mounted on the opposite end of said drum and journalled on said frame, a gear drive for said shaft mounted on said frame, a speed changing transmission gear mounted on said frame, and a flexible connection between said transmission gear and said driving gear.

11. In a combined churn and butter worker, the combination with a rotary drum, a stationary frame, and butter working rollers mounted on an independent carriage and insertable in said drum through an opening in the front thereof, of roller supports on said frame for the front end of said drum to provide a rotary mounting for said drum while leaving the front end unobstructed, a driving shaft for said drum secured to the rear end thereof and journalled on the frame, a power transmission gear mounted on the frame, a flexible connection between said power transmission and gear drive, and means for driving said rolls when inserted in the drum from said power transmission gear.

12. In a combined churn and butter worker, the combination with a rotary drum, a stationary supporting frame therefor, and butter working rolls mounted on an independent carriage and insertable in an open end of said drum, of a driving mechanism for said drum and rolls comprising a driving gear unit for said drum, a shaft extending transversely at the closed end of said drum, a shaft extending longitudinally at one side of said drum and detachably connected with the rolls, and a speed changing transmission gear unit mounted on said frame at the angle formed by said shafts and operably connected with both of said shafts.

13. In a combined churn and butter worker, the combination with a rotary drum, a stationary frame therefor, and butter working rolls mounted on an independent carriage and insertable in an open end of said drum of a driving mechanism for said drum and rolls comprising a speed changing transmission gear unit mounted on said frame at one end and to one side of said drum and connected with the operating power, a drum driving gear unit, a connecting shaft extending transversely at one end of the drum between said drum driving gear and transmission gear units, a roll driving mechanism extending transversely at the opposite end of said drum and having a detachable connection with said rolls, and a shaft extending longitudinally at one side of the drum and connected with the roll driving mechanism and with the transmission gear unit.

14. In a churn, the combination with a rotary drum, and a stationary supporting frame therefor, of a shaft secured to one end of said drum and rotatably mounted on said frame, a gear housing into which said shaft extends, a worm drive gear unit for said shaft enclosed within said housing, a speed changing transmission gear unit mounted on said frame, and a flexible shaft extending substantially parallel with one end of said drum and connecting said transmission gear and said worm drive gear units.

15. In a churn, the combination with a rotary drum, and a stationary frame, of roll supports on said frame for the front end of the drum to provide a rotary mounting for said drum while leaving the front end thereof unobstructed, a driving shaft mounted on the opposite end of said drum and journalled on said frame, a gear drive unit for said shaft mounted on said frame, a speed changing transmission gear unit mounted on said frame, and a shaft extending substantially parallel with the end of said drum for connecting the transmission gear and the drum driving gear.

16. In a combined churn and butter worker, the combination with a rotary drum, a stationary supporting frame therefor, and butter working rolls mounted on an independent carriage and insertable in an open end of said drum, of a driving mechanism for said drum and rollers comprising a gear drive unit for said drum at the rear end thereof, a speed changing transmission gear unit mounted on said frame at the rear end and to one side of said drum, a power shaft connected with said transmission gear, a clutch for connecting said transmission gear unit with the drum gear drive, means extending forwardly from said transmission gear detachably connected with the butter working rolls for operating said rolls, and means for controlling the starting and stopping of said power shaft and for controlling said clutch operable from the front end of said drum.

17. In a combined churn and butter worker, the combination with a rotary drum, a stationary supporting frame therefor, and butter working rolls mounted on an independent carriage and insertable in an open end of said drum, of a driving mechanism for said drum and rolls comprising a driving gear unit for said drum, a shaft extending transversely at the closed end of said drum, a shaft extending longitudinally at one side of said drum and detachably connected with the rolls, and a speed changing transmission gear unit mounted on said frame and operably connected with both of said shafts.

HARVEY FELDMEIER.
CHARLES B. DALZELL.